United States Patent
Veeravarapu et al.

(10) Patent No.: US 10,110,670 B2
(45) Date of Patent: Oct. 23, 2018

(54) ALLOCATION OF SERVICE ENDPOINTS TO SERVERS

(71) Applicant: Oracle International Corporation, Redwood Shores, CA (US)

(72) Inventors: Pavan Veeravarapu, Banglaore (IN); Nandagopal Srinivasan, Bangalore (IN); Sanjib Swain, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 468 days.

(21) Appl. No.: 14/803,139

(22) Filed: Jul. 20, 2015

(65) Prior Publication Data

US 2017/0026464 A1 Jan. 26, 2017

(51) Int. Cl.
*H04L 29/08* (2006.01)
*H04L 12/26* (2006.01)

(52) U.S. Cl.
CPC ...... *H04L 67/1012* (2013.01); *H04L 43/0817* (2013.01); *H04L 43/10* (2013.01)

(58) Field of Classification Search
CPC ... H04L 67/102; H04L 43/0817; H04L 43/10; H04L 67/22
USPC .................................. 709/220–226
See application file for complete search history.

(56) References Cited

U.S. PATENT DOCUMENTS

| | | | |
|---|---|---|---|
| 7,475,280 B1 | 1/2009 | Schlomer et al. | |
| 7,743,155 B2 | 6/2010 | Pisharody et al. | |
| 8,438,417 B2 | 7/2013 | Li et al. | |
| 8,601,101 B1* | 12/2013 | Singh | H04L 69/40 370/254 |
| 2005/0169169 A1 | 8/2005 | Gadde | |
| 2007/0130367 A1 | 6/2007 | Kashyap | |
| 2013/0185408 A1* | 7/2013 | Ngo | H04L 41/046 709/223 |
| 2013/0283273 A1* | 10/2013 | Miyazaki | G06F 9/45533 718/1 |
| 2014/0188795 A1 | 3/2014 | Alewine et al. | |

OTHER PUBLICATIONS

MirthApplianceDeploymentGuide3.9.0, date Mar. 3, 2015, pp. 1-122.
(Continued)

*Primary Examiner* — Glenton B Burgess
*Assistant Examiner* — Christopher P Cadorna
(74) *Attorney, Agent, or Firm* — IPHorizons PLLC; Narendra Reddy Thappeta

(57) ABSTRACT

An aspect of the present disclosure provides for allocation of service endpoints to servers. In an embodiment, an endpoint table is maintained to specify currently allocation of respective service endpoints to corresponding server systems. Upon occurrence of a condition requiring reallocation of a first set of service endpoints currently allocated to a first server system, the first set of service endpoints are reallocated among the operational server systems (typically the server systems other than the first server system). The endpoint table is accordingly updated in accordance with the reallocation. When a packet is thereafter received directed for delivery to a target service endpoint, the packet is delivered to one of the operational server systems, which is indicated as being allocated the target service endpoint in the updated endpoint table.

20 Claims, 7 Drawing Sheets

(56) References Cited

OTHER PUBLICATIONS

Cancer Care Ontario Enterprise Architecture, date Mar. 2013, pp. 1-163.
ESB for Healthcare, date 2011, pp. 1-34.
Openstack High Availability, date Mar. 13, 2015, pp. 1-58.
Benefits of an Active-Active High Availability Implementation for Interface Engines and other Mission Critical Systems, http://www.santarosaconsulting.com/SantaRosaTeamBlog/post/2011/04/05/Benefits-of-an-Active-Active-High-Availability-Implementation-for-Interface-Engines-and-other-Mission-Critical-Systems.aspx, downloaded circa Mar. 17, 2015, pp. 1-2.
Active active cluster with real-time replication, http://www.evidian.com/products/high-availability-software-for-application-clustering/active-active-cluster-real-time-replication/, downloaded circa Mar. 17, 2015, pp. 1-6.
Configuring ActiveActive HA, date 2014, pp. 1-33.
Assured-availability-overview-corepoint-integration-engine, pp. 1-2.
Oracle Corporation, Working with Endpoints, Oracle Fusion Middleware Healthcare Integration User's Guide for Oracle SOA Suite, 11g Release 1 (11.1.1.7) MLR, http://www.oracle.com/technetwork/middlewear/soasuite/documentation/hfpug-1994287.pdf, date Aug. 2013, pp. 1-10, 71-94.

\* cited by examiner

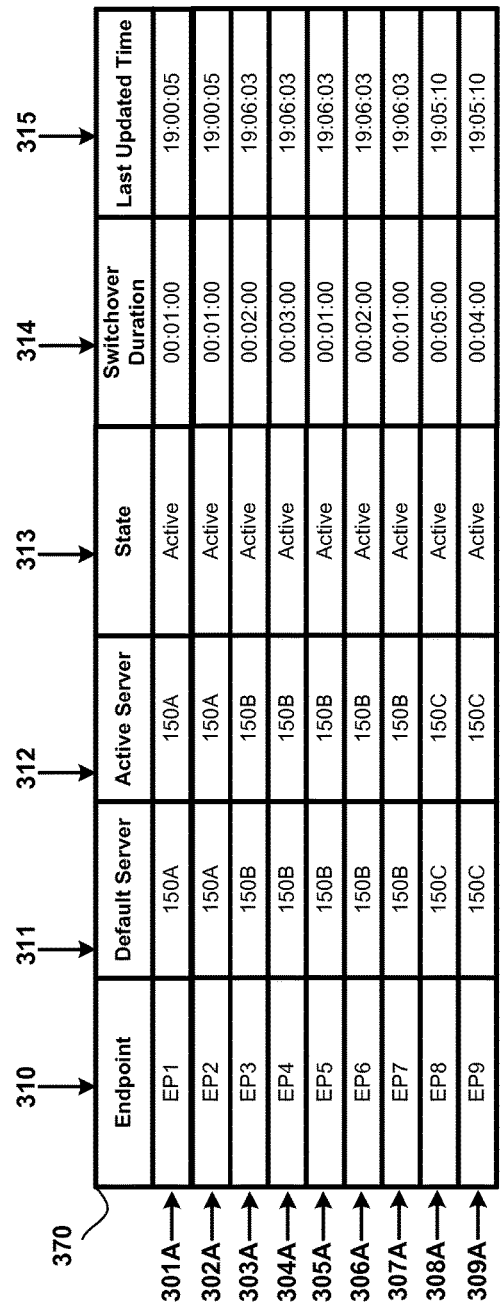

FIG. 3A

| | Endpoint | Default Server | Active Server | State | Switchover Duration | Last Updated Time |
|---|---|---|---|---|---|---|
| 301A | EP1 | 150A | 150A | Active | 00:01:00 | 19:00:05 |
| 302A | EP2 | 150A | 150A | Active | 00:01:00 | 19:00:05 |
| 303A | EP3 | 150B | 150B | Active | 00:02:00 | 19:06:03 |
| 304A | EP4 | 150B | 150B | Active | 00:03:00 | 19:06:03 |
| 305A | EP5 | 150B | 150B | Active | 00:01:00 | 19:06:03 |
| 306A | EP6 | 150B | 150B | Active | 00:02:00 | 19:06:03 |
| 307A | EP7 | 150B | 150B | Active | 00:01:00 | 19:06:03 |
| 308A | EP8 | 150C | 150C | Active | 00:05:00 | 19:05:10 |
| 309A | EP9 | 150C | 150C | Active | 00:04:00 | 19:05:10 |

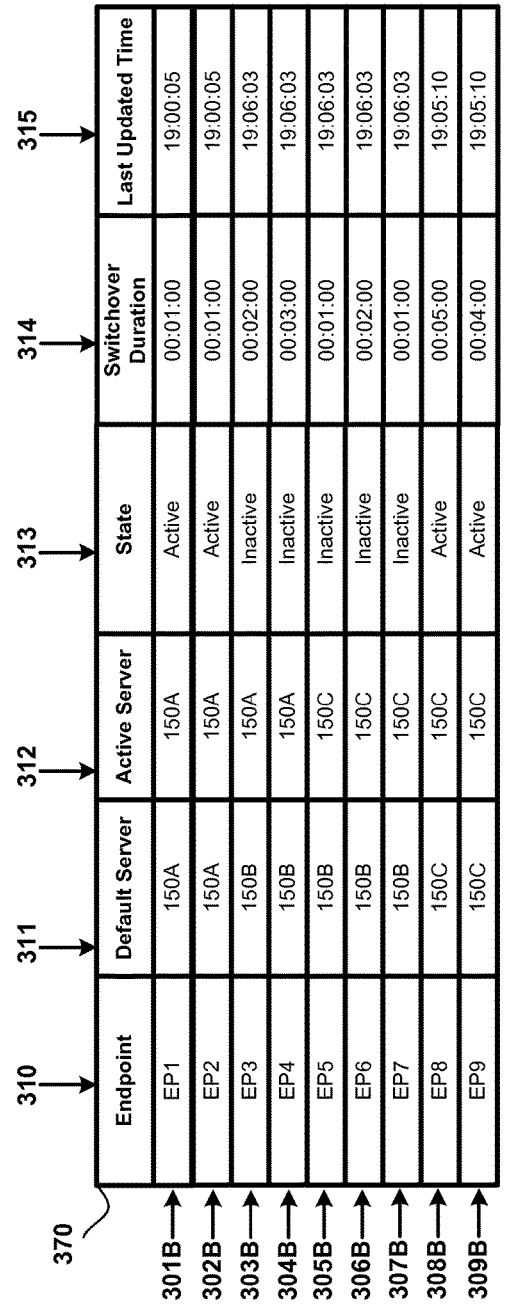

FIG. 3B

| | Endpoint | Default Server | Active Server | State | Switchover Duration | Last Updated Time |
|---|---|---|---|---|---|---|
| 301B | EP1 | 150A | 150A | Active | 00:01:00 | 19:00:05 |
| 302B | EP2 | 150A | 150A | Active | 00:01:00 | 19:00:05 |
| 303B | EP3 | 150B | 150A | Inactive | 00:02:00 | 19:06:03 |
| 304B | EP4 | 150B | 150A | Inactive | 00:03:00 | 19:06:03 |
| 305B | EP5 | 150B | 150C | Inactive | 00:01:00 | 19:06:03 |
| 306B | EP6 | 150B | 150C | Inactive | 00:02:00 | 19:06:03 |
| 307B | EP7 | 150B | 150C | Inactive | 00:01:00 | 19:06:03 |
| 308B | EP8 | 150C | 150C | Active | 00:05:00 | 19:05:10 |
| 309B | EP9 | 150C | 150C | Active | 00:04:00 | 19:05:10 |

FIG. 3C

| Endpoint | Default Server | Active Server | State | Switchover Time | Last Updated Time |
|---|---|---|---|---|---|
| EP1 | 150A | 150A | Active | 00:01:00 | 19:10:12 |
| EP2 | 150A | 150A | Active | 00:01:00 | 19:10:12 |
| EP3 | 150B | 150A | Active | 00:02:00 | 19:10:12 |
| EP4 | 150B | 150A | Active | 00:03:00 | 19:10:12 |
| EP5 | 150B | 150C | Inactive | 00:01:00 | 19:06:03 |
| EP6 | 150B | 150C | Inactive | 00:02:00 | 19:06:03 |
| EP7 | 150B | 150C | Inactive | 00:01:00 | 19:06:03 |
| EP8 | 150C | 150C | Active | 00:05:00 | 19:05:10 |
| EP9 | 150C | 150C | Active | 00:04:00 | 19:05:10 |

FIG. 3D

| Endpoint | Default Server | Active Server | State | Switchover Time | Last Updated Time |
|---|---|---|---|---|---|
| EP1 | 150A | 150A | Active | 00:01:00 | 19:10:12 |
| EP2 | 150A | 150A | Active | 00:01:00 | 19:10:12 |
| EP3 | 150B | 150A | Active | 00:02:00 | 19:10:12 |
| EP4 | 150B | 150A | Active | 00:03:00 | 19:10:12 |
| EP5 | 150B | 150C | Active | 00:01:00 | 19:11:03 |
| EP6 | 150B | 150C | Active | 00:02:00 | 19:11:03 |
| EP7 | 150B | 150C | Active | 00:01:00 | 19:11:03 |
| EP8 | 150C | 150C | Active | 00:05:00 | 19:11:03 |
| EP9 | 150C | 150C | Active | 00:04:00 | 19:11:03 |

ALLOCATION OF SERVICE ENDPOINTS TO SERVERS

BACKGROUND

Technical Field

The present disclosure relates to enterprise systems and more specifically to allocation of service endpoints to servers.

Related Art

A server generally operates to process requests from user systems (and their users), and communicate corresponding output to the requesting systems. Each server may be configured to provide one or more services to user systems, where a service may be defined as a functionality specifically requested by a user. In the context of servers supporting the process flows of a healthcare system, examples of services include accepting a pharmacy order, providing an invoice, etc.

An endpoint represents a termination point to which messages may be addressed and/or from which messages may originate. In Internet Protocol (IP) environments such endpoints are typically specified by a combination of IP address, transport protocol (TCP, UDP, etc.), and corresponding port number.

Thus, a service endpoint represents such endpoint using which user systems can avail of (e.g., invoke) the corresponding service implemented in a server. A service endpoint is also associated with an interface definition, which specifies message formats for availing of the services and for the output to be expected. Multiple services may be provided at a single endpoint.

Allocation of a service endpoint to a server implies that the service requests received for that endpoint are processed by the allocated server. Such allocation may be particularly important when many service endpoints are employed and can be allocated among several servers, for reasons such as scalability and higher throughput performance.

Aspects of the present disclosure are directed to allocation of service endpoints to servers, where many servers may be employed to process service requests received on many of the service endpoints.

BRIEF DESCRIPTION OF THE DRAWINGS

Example embodiments of the present disclosure are described with reference to the accompanying drawings briefly described below.

FIG. 3A illustrates the manner in which an endpoint table for service endpoints is maintained on a server system prior to start of reallocation of the endpoints associated with a non-operational server, in an embodiment.

FIG. 3B illustrates the manner in which an endpoint table for service endpoints is maintained on a server system, during the transient period before the reallocation of endpoints of a non-operational server is completed, in an embodiment.

FIG. 3C illustrates the manner in which an endpoint table for service endpoints is maintained on a server system, after the reallocation of some of the endpoints of the non-operational server is completed, in an embodiment.

FIG. 3D illustrates the manner in which an endpoint table for service endpoints is maintained on a server system, after the reallocation of all of the endpoints of the non-operational server are completed, in an embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present disclosure provides for allocation of service endpoints to servers. In an embodiment, an endpoint table is maintained to specify currently allocation of respective service endpoints to corresponding server systems. Upon occurrence of a condition requiring reallocation of a first set of service endpoints currently allocated to a first server system, the first set of service endpoints are reallocated among the operational server systems (typically the server systems other than the first server system). The endpoint table is accordingly updated in accordance with the reallocation. When a packet is thereafter received directed for delivery to a target service endpoint, the packet is delivered to one of the operational server systems, which is indicated as being allocated the target service endpoint in the updated endpoint table.

As a result, each endpoint is associated with (or active on) only one of servers systems, and packets directed to that endpoint are accordingly processed by the associated server system only. In addition, the servers operate to provide a high availability system, since upon failure of one of the server systems, the endpoints of the failing server system are moved to operational server systems.

In an embodiment the servers are deployed to provide services in health care industry, and the service endpoints are defined to request services related to placing a pharmacy order, providing an invoice, etc.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
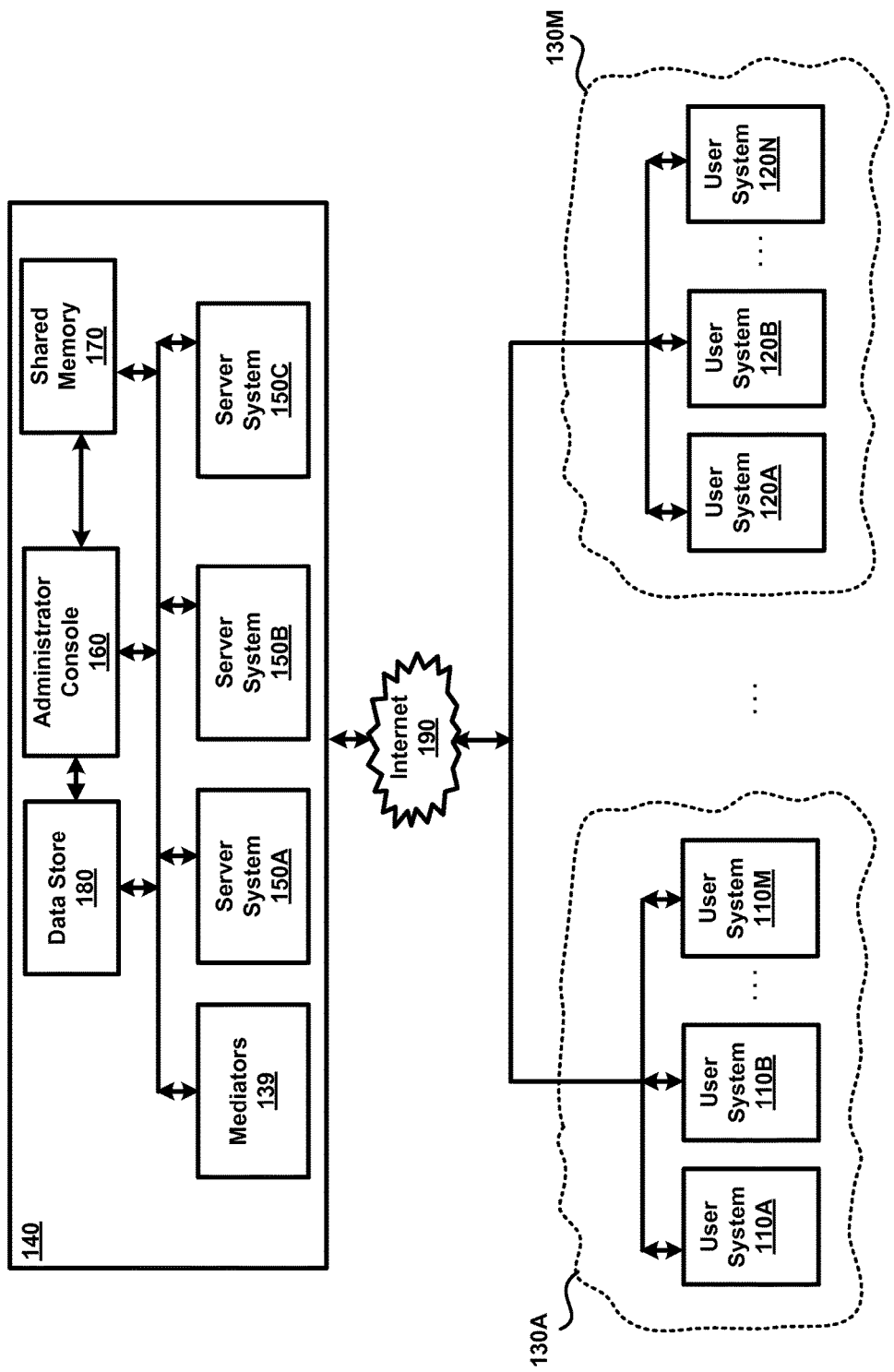
FIG. 1 is a block diagram illustrating an example environment in which several aspects of the present disclosure can be implemented.

FIG. 1 is a block diagram illustrating an example environment in which several aspects of the present disclosure can be implemented. The block diagram is shown containing user systems 110A-110M and 120A-120N, server systems (servers) 150A-150C, mediators 139, administrator console 160, shared memory 170, data store 180 and Internet 190. Merely for illustration, only representative number/type of systems is shown in the Figure. Many environments often contain many more systems, both in number and type, depending on the purpose for which the environment is designed. Each system/device of FIG. 1 is described below in further detail.

User systems 110A-110M and user systems 120A-120N are provided within corresponding functional areas of an enterprise (shown with dotted boundaries 130A and 130M respectively). In the context of a healthcare system, functional areas may be represented as pharmacy, admissions, labs, etc. Each of user systems 110A-110M and 120A-120N represents a system such as a terminal, personal computer, workstation, mobile station, mobile phones, computing tablets, etc., used by users to send user requests to service endpoints defined on server systems 150A-150C, and receive the corresponding responses generated by such service endpoints, via server system 150A-150C. The requests and responses may be transmitted on TCP or UDP transports, based on the corresponding definition of the respective endpoints.

Internet 190 represents a network providing connectivity between user systems 110A-110M and 120A-120N, and server systems 150A-150C. Internet 190 may be implemented using Internet Protocol (IP), well known in the relevant arts. In general, in internetworking environments, an IP packet (containing a datagram) is used as a basic unit of transport, with the source address being set to the IP address assigned to the source system from which the packet originates and the destination address set to the IP address of the destination system to which the packet is to be eventually delivered.

In the example of user request from a user system 110A-110M and 120A-120N to the server systems 150A-150C, the source address would be set to the IP address of the requesting source system (i.e., one of user systems 110A-110M and 120A-120N), and the destination address would be set to the IP address of server site 140 (which may in reality represent the IP address of a front-end system, not shown, which thereafter distributes the packets to one of the servers).

When the packet contains content such as port numbers, which specifies the connection or service endpoint, the packet may be said to be directed to an application/service instance processing the requests contained in such packets. In general, the combination of a source IP address, destination IP address, transport protocol, source port number and destination port number specifies a unique connection (according to the transport protocol), which terminates at the destination IP address/port number at one end and at the source IP address/port number at the other end. The connection endpoints at the server systems may operate as service endpoints as well by appropriate design of the higher layers in server site 140.

Data store 180 represents a non-volatile storage facilitating storage and retrieval of a collection of data by one or more services (or applications implementing such services) executing in servers 150A-150C (typically while processing various client/user requests) and by mediators 139. Data store 180 may be implemented using relational database technologies and therefore provide storage and retrieval of data using structured queries such as SQL (Structured Query Language).

Administrator console 160 enables a user/administrator to manage the various systems within server site 140. For example, such management functions may include configuration of one or more of server systems 150A-150C (for example executing/implementing particular services within the servers), to define service endpoints, to receive failure notifications from the servers, to perform maintenance operations on servers 150A-150C, to perform maintenance operations on data stored in shared memory 170 and data store 180 etc.

Shared memory 170 provides an efficient and centralized cache area that may be accessed by the devices of server site 140, including server systems 150A-150C and administrator console 160. Shared memory 170 maintains a table ("endpoint table") indicating the service endpoints that are configured in server site 140 and allocated to various servers, according to aspects of the present disclosure, as described below in further detail. Shared memory 170 may be implemented based on one or more of random access memory (RAM), content addressable memory (CAM), database, etc., as will be apparent to a skilled practitioner by reading the disclosure herein.

Server systems 150A-150C are provided in a server site 140, which may correspond, for example, to a group of networked servers in a data center. Alternatively, server site 140 may contain many physical servers of a server farm, and server systems 150A-150C may represent virtual machines provided in such a farm. For the purposes of the instant application, it is assumed that servers 150A-150C are realized as virtual machines implemented in software on a server farm provided in server site 140. The group of server systems may be addressable by a single IP address, or multiple IP addresses. In either case, server site 140 may also contain a front end system, which distributes the received packets internally to various server systems. In an embodiment, each server system 150A-150C executes an instance of Oracle SOA Suite for Healthcare Integration, which is a component of Oracle SOA Suite, provided by Oracle International Corporation, the intended assignee of the subject patent application.

Service endpoints are defined relative to the whole group of servers (i.e., 150A-150C). However, each of the server systems 150A-150C may have execution entities (applications) to process requests received on the service endpoints allocated to the respective servers. The output generated by such processing may be provided to end-users on user systems 110A-110M, and 120A-120N and/or stored again in data store 180. Service endpoints are typically configured by specifying the name of the endpoint, location of the endpoint, the transport protocol used in exchanging messages, the types of messages/documents to be exchanged, and other configuration parameters such as the status and the connection mode (i.e., whether the endpoint is defined at the client or the server) of the endpoint. An example approach to specifying service endpoints is referred to in the document entitled "Working with Endpoints", provided by Oracle International Corporation, the intended assignee of the subject patent application.

Mediators 139 process service requests received from respective ones of server systems 150A-150C by using the services provided by other server systems or external systems (not shown), for example according to Service Oriented Architecture (SOA). Although mediators 139 are shown as a single block external to server systems 150A-150C, it should be appreciated that respective instances of mediators may be integrated into individual server systems, as would be understood by persons skilled in the relevant arts.

In a typical implementation, service endpoints are allocated to various server systems 150A-150C. According to aspects of the present disclosure, there may be a need to change allocation of service endpoints from one server to another. For example, when one or more of the server systems becomes non-operational, the service endpoints allocated to the non-operational server system also become unable to receive packets. Aspects of the present disclosure provide for allocating service endpoints to servers, as described below with examples.

3. Flowchart

Figure 2:
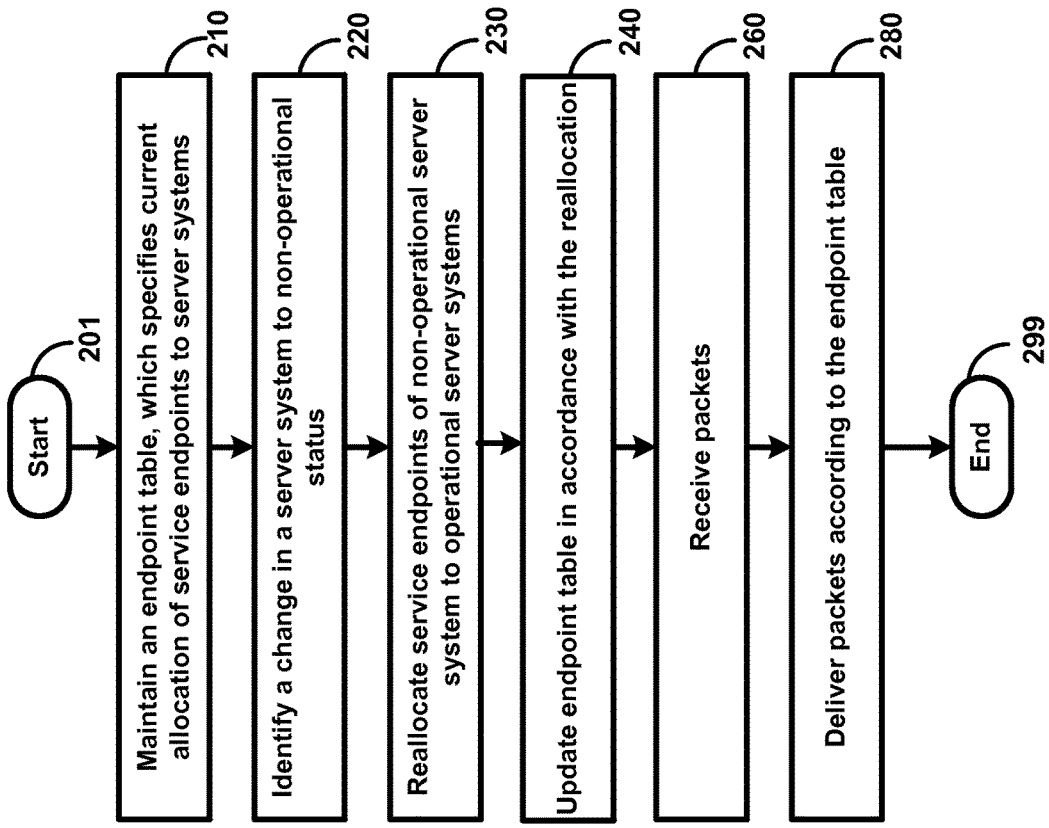
FIG. 2 is a flow chart illustrating the manner in which service endpoints are allocated to servers, according to an aspect of the present disclosure.

FIG. 2 is a flow chart illustrating the manner in which service endpoints are allocated to servers, according to an aspect of the present disclosure. The flowchart is described with respect to the systems of FIG. 1 merely for illustration. However, many of the features can be implemented in other systems and/or other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, an endpoint table is maintained. As noted above, service endpoints are defined relative to the whole group of server systems available in a server site, with each server system having one or more execution entities that processes requests received on service endpoints allocated to that server. Since the service endpoints are defined relative to the whole group of server systems, the identity of the endpoints (combination of IP address, transport protocol, and port number) in server site 140 is unique. For example, no two endpoints will have the same endpoint ID in the endpoint table. The endpoint table is maintained in shared memory, and specifies the current allocation of service endpoints to server systems. Therefore, when a packet (i.e., a request) is received at server site directed to a service endpoint, the packet is delivered to the server that has the endpoint currently allocated, as specified in the endpoint table, for further processing.

In step 220, the status of a server system is identified as having changed to non-operational status. For example, there may be situations where one or more of the servers in server site experiences a power failure, or terminates due to insufficient memory, excessive load etc. When a server experiences such situations, the server is said to have entered a non-operational status, where the server (and the respective allocated service endpoints) becomes unavailable to receive and/or process any incoming packets. The identification of a server system to non-operational status may be performed centrally (e.g., by an administrative function of server site), or in a distributed fashion (e.g., by each of the server systems 150A-150C), as would be understood by those skilled in the art by reading the disclosure herein.

It may be appreciated that changing to non-operational status represents an example condition requiring reallocation of service endpoints (currently allocated to one server) among other operational servers, though reallocation in alternative embodiments can be triggered by various other conditions, as will be apparent to a skilled practitioner based on the disclosure provided herein.

In step 230, service endpoints of the non-operational server system are reallocated to operational server systems. As noted above, when a server becomes non-operational, the respective service endpoints allocated to the non-operational server become unavailable to receive and/or process any further incoming packets.

Therefore, in order to provide the continued facility of processing of requests directed to endpoints previously allocated to now non-operational servers, the service endpoints allocated to the non-operational server are reallocated to one or more operational server systems, which have the capacity (e.g., processing power) to accept the additional processing load brought on by such addition of service endpoints. Since the endpoints have unique identities, reallocation of endpoints from the non-operational server to another (operational) server does not cause any conflict with the endpoints presently allocated in the operational server. As evident, if the endpoint identities in server site 140 were non-unique, when the endpoints from the non-operational server are reallocated to an operational server, conflicts would arise (in moving the endpoints from one server to the other server) between the reallocated endpoints and existing endpoints if there was a duplication of endpoint identifiers between some or all of the reallocated endpoints and the existing endpoints on the operational server. Such reallocation may be performed centrally (e.g., by an administrative function of server site), or in a distributed fashion (e.g., by each of the server systems 150A-150C), as would be understood by those skilled in the art by reading the disclosure herein.

In step 240, the endpoint table is updated in accordance with the reallocation of step 230. As described in step 210, when a packet arrives at server site targeted at a service endpoint, the packet is delivered to the individual server that is allocated the particular service endpoint, as specified in the endpoint table. However, since the service endpoints of the non-operational server system are reallocated to operational server systems (per step 230), the endpoint table also needs to be updated to reflect such reallocation, so that when packets are received subsequently directed at the service endpoints of the non-operational server, the incoming packets may be delivered to the reallocated operational server as specified in the endpoint table. Similar to steps 220 and 230, the updating of the endpoint table may be performed centrally, or in a distributed fashion.

In step 260, packets are received from user systems. As noted above with reference to FIG. 1, user systems are used by users to send user requests to service endpoints, and to receive the corresponding responses generated by such service endpoints. The requests are received in the form of corresponding packets (directed to server site 140), and responses are sent in the form of packets (directed to the requesting user systems) as well.

In step 280, the incoming (i.e., received) packets are delivered according to the endpoint table. As described above, in the context of packets received prior to the reallocation and update of service endpoints (in accordance with steps 230 and 240), any incoming packets would be delivered according to the previously (i.e., originally) allocated service endpoints (as described with respect to step 210). However, in the context of packets received after the reallocation and update of service endpoints (subsequent to a server becoming non-operational), the incoming packets directed at service endpoints previously allocated to the non-operational server system are delivered to the operational server system to which the service endpoints are reallocated. The flowchart ends in step 299.

Thus, in accordance with FIG. 2, in the event of a server system becoming non-operational, any service endpoints allocated to that server system are then reallocated to operational server systems such that communication between server site and the user systems continues in an uninterrupted fashion.

While the above features are applicable in a variety of environments, the description is continued with respect to the manner in which the endpoint table is maintained in an embodiment to facilitate such features.

4. Endpoint Table

FIGS. 3A-3D respectively illustrate the state of an endpoint table at corresponding time instances as the server systems change status from operational to non-operational status. As noted above, endpoint table 370 is maintained in shared memory 170. Each column of the tables is described first, and then the differences between the tables are described.

Endpoint table 370 is shown containing several fields, endpoint 310, default server 311, active server 312, state 313, switchover duration 314, and last updated time 315. Only some of the fields of the endpoint table, as relevant to an understanding of the disclosure, are depicted in the Figure for conciseness. However, the table can contain other columns, as will be apparent to a skilled practitioner.

Endpoint 310 represents the identity of the service endpoints in server site 140. Though the identity of each service endpoint is shown as a textual label, it should be appreciated that each label can be uniquely mapped to a combination of IP address, transport protocol (UDP or TCP) and port number. As described above, service endpoints are configured in server site 140 and allocated to various servers in server site. Accordingly, endpoint 310 stores the identity of the endpoints configured in server site and allocated to the various servers in server site. As noted above, the endpoint IDs in column 310 are all unique (i.e., non-repeating/unduplicated).

Default server 311 represents the initial server to which a corresponding endpoint is allocated. As noted earlier, each service endpoint is allocated initially to a particular server. Default server 311 represents that initial server to which the corresponding endpoint was originally allocated. Accordingly, the value stored in this field does not change, irrespective of the operational status of the corresponding server.

Active server 312 represents the server to which the corresponding endpoint is currently allocated. As noted earlier, during the operation of server site 140, if one or more of the initially allocated servers becomes non-operational, the endpoints associated with the non-operational server may be reallocated to other operational servers. If such a reallocation happens, the active server 312 field represents the identity of the server to which the corresponding endpoints are reallocated. If servers do not become non-operational, or if a non-operational server returns to an operational status (at which point the endpoints previously allocated to the non-operational server may be reallocated to the now operational server), the server represented in this field would be the same as the server represented in the default server 311 field.

Last updated time 315 represents a field in which the active server of the corresponding endpoint, stamps (or writes) a current time stamp. Such time stamping is performed to indicate that the active server is available to process requests received at the corresponding endpoint (at the time instance of the time stamp). Accordingly, each active server (assigned the corresponding endpoints) would update the corresponding entry (row and column intersection) with the then current time stamp periodically. As described below, the timestamp in the last updated time 315 becomes the basis for determining when/whether to reallocate the endpoints if the associated server were to become non-operational.

State 313 is a field used for reallocation of endpoints by operations server systems in a distributed matter. An 'active' value there indicates a generally normal state in which the corresponding active server is operational, and that value continues in the duration when the server in the active server 312 column becomes non-operational until one of the operational servers ("new responsible server") identifies the endpoint for reallocation to itself (i.e., self-allocate) or to another operational server. The new responsible server is the first of the operational servers to access the endpoint table 370 and to identify the endpoints associated with the non-operational server as ready for reallocation. An 'inactive' value in that column is used by the new responsible server or other operational servers in the transient duration of reallocation, as will be described in further detail below. The field can also have 'Disabled' value, which indicates that the endpoint is not available to receive requests, and is often based on administrator configuration.

Switchover duration 314 reflects a (buffer) duration for the corresponding endpoint representing a permissible duration from the corresponding last updated time, until which the active server should be assumed to be available to process the requests received at the corresponding endpoint. Thus, so long as the last updated time 315 contains a time stamp, which is within a duration defined by switchover duration 314, the corresponding active server is deemed to be available for processing requests received at the endpoint.

Practically, switchover duration may represent the criticality of the endpoint in the context of the environment in which it is implemented. For example, for endpoints providing time-critical services such as admissions and pharmacy, the switchover duration may be very low due to the assumption that such endpoints may not be inactive for a long time. On the other hand, for endpoints providing non time-critical services such as storage of vitals in an archival database, the switchover duration may be relatively higher (than the endpoints providing time-critical services).

The manner in which entries of endpoint table are changed is described below in an example scenario.

5. Reallocation with an Example

FIG. 3A shows entries in the endpoint table at a time instance at which server system 150B becomes non-operational, but prior to start of reallocation of the endpoints associated with server system 150B to other operational servers. It is assumed that prior to entering the non-operational status, server system 150B was operational, along with the other operational server systems 150A and 150C.

Rows 301A-309A show the information on various service endpoints stored in the endpoint table 370. Rows 301A-302A show information for endpoints allocated to server 150A (i.e., EP1 and EP2 in column 310). Rows 303A-307A show information for endpoints allocated to server system 150B (i.e., EP3-EP7 in column 310). Similarly, rows 308A-309A show information for endpoints allocated to server system 150C (i.e., EP8-EP9 in column 310). As shown, endpoints with the same endpoint names are not defined on different instances, i.e., endpoint names are uniquely assigned with reference to all server systems in server site 140.

The identity of the servers in the default server 311 field and the active server 312 field match in each of the rows 301A-302A and 308A-309A since the server systems 150A and 150C are operational, i.e., the corresponding endpoints continue to be allocated to their respective default servers. The identity of the servers in the default server 311 field and the active server 312 field match in each of the rows 303A-307A even though server system 150B is non-operational, since FIG. 3A contains data prior to the reallocation of the endpoints associated with server system 150B to other operational servers.

Similarly, since FIG. 3A shows endpoint data prior to the reallocation of endpoints allocated to server system 150B, the state column 313 of each of the servers across rows 301A-309A and 308A-309A is shown as "Active".

Each of rows 301A-309A also shows a last updated time in column 315 representing a field in which the active server of the corresponding endpoint, stamps (or writes) a current time stamp. As shown, the last updated time for endpoints allocated to the same active server are the same, since the active server updates the last updated time for all the endpoints allocated to that server using a single time stamp for that iteration of updates.

Each of rows 301A-309A also shows a switchover duration in column 314 for endpoints representing the permissible duration from the corresponding last updated time, until which the active server should be assumed to be available to process the requests received at the corresponding endpoint. As noted above, various switchover durations shown in rows 301A-309A may represent various magnitudes of criticality of the corresponding endpoints in server site 140. For example, endpoint EP1 with a switchover duration of 1 minute may be considered to be a more critical (i.e., needs to be allocated to an operational server sooner) than the endpoint EP8, which has a switchover duration of 5 minutes.

FIG. 3B shows endpoint data with respect to all servers, after server system 150B becomes non-operational, and during the transient period before the reallocation of endpoints is completed. Specifically, FIG. 3B shows endpoint data after a new responsible server 150A identifies EP3-EP7 as the service endpoints that need to be reallocated. As described above, the first of the operational servers to access endpoint table 370 and to identify the endpoints associated with the non-operational server as ready for reallocation is referred to as the new responsible server.

In an embodiment, identifying the endpoints associated with the non-operational server as ready for reallocation may imply that the new responsible server 150A updates the state column 313 for each of the endpoints EP3-EP7 to "inactive" and the active server 312 for each of the endpoints to indicate which of the endpoints the new responsible server 150A is responsible for (i.e., EP3 and EP4) and which of the endpoints the other operational server system 150C is responsible for (i.e., EP5-EP7).

FIG. 3C shows endpoint data with respect to all servers, after server system 150B becomes non-operational, and the new responsible server system 150A completes the reallocation of endpoints EP3 and EP4.

The new responsible server 150A is shown have updated the state column 313 for each of the endpoints EP3 and EP4 to "active" to complete the reallocation (i.e., self-allocation in this context) of endpoints. The last updated time column is updated with a current time stamp also, to ensure the endpoint is not again reallocated to any of the other servers.

Similarly, the other operational server system 150C may self-allocate the remaining endpoints EP5-EP7 in a manner similar to the manner of reallocation described above with reference to server 150A. The corresponding status is shown in FIG. 3D, with endpoints EP5-EP7 being self-allocated by server system 150C.

If the non-operational server 150B subsequently becomes operational, administrator console 160 notifies all the server systems 150A-150C of the change of operational status. Server system 150A identifies the service endpoints (EP3 and EP4) with default server set to 150B and active server column set to 150A (self), and changes the entries at a suitable time to inactive status. Server system 150B thereafter changes the active server of such entries to 150B (self). The remaining service endpoints are also similar allocated back to server system 150B (once server system 150B is deemed to be operational).

Although not shown, endpoint table 370 may also be configured with a "preferred server" column, which would contain the identity of a preferred server system to which the corresponding endpoint is to be reallocated in the event that the "active server" associated with that endpoint becomes non-operational. The preferred server configuration may be defined by an administrator, and may be useful in certain situations. For example, certain endpoints may need to be allocated on servers with specialized hardware/software implementations (e.g., servers with high throughput capacity, or certain custom software). When an active server with such specialized hardware/software implementations becomes non-operational, it is desirable to reallocate the corresponding endpoints to servers that contain similar specialized implementations of hardware/software that is advantageous, but not required. Therefore, an administrator can take such needs into consideration prior to setting the server in the preferred server column. If a preferred server column is present and a value (indicating a preferred server) is set in a corresponding row of the preferred server column, servers other than the preferred server may be configured to ignore the corresponding service endpoints for the purposes of reallocation.

The description is continued with respect to the internal details of server site 140 implementing some of the features, in an embodiment.

6. Server Site

Figure 4A:
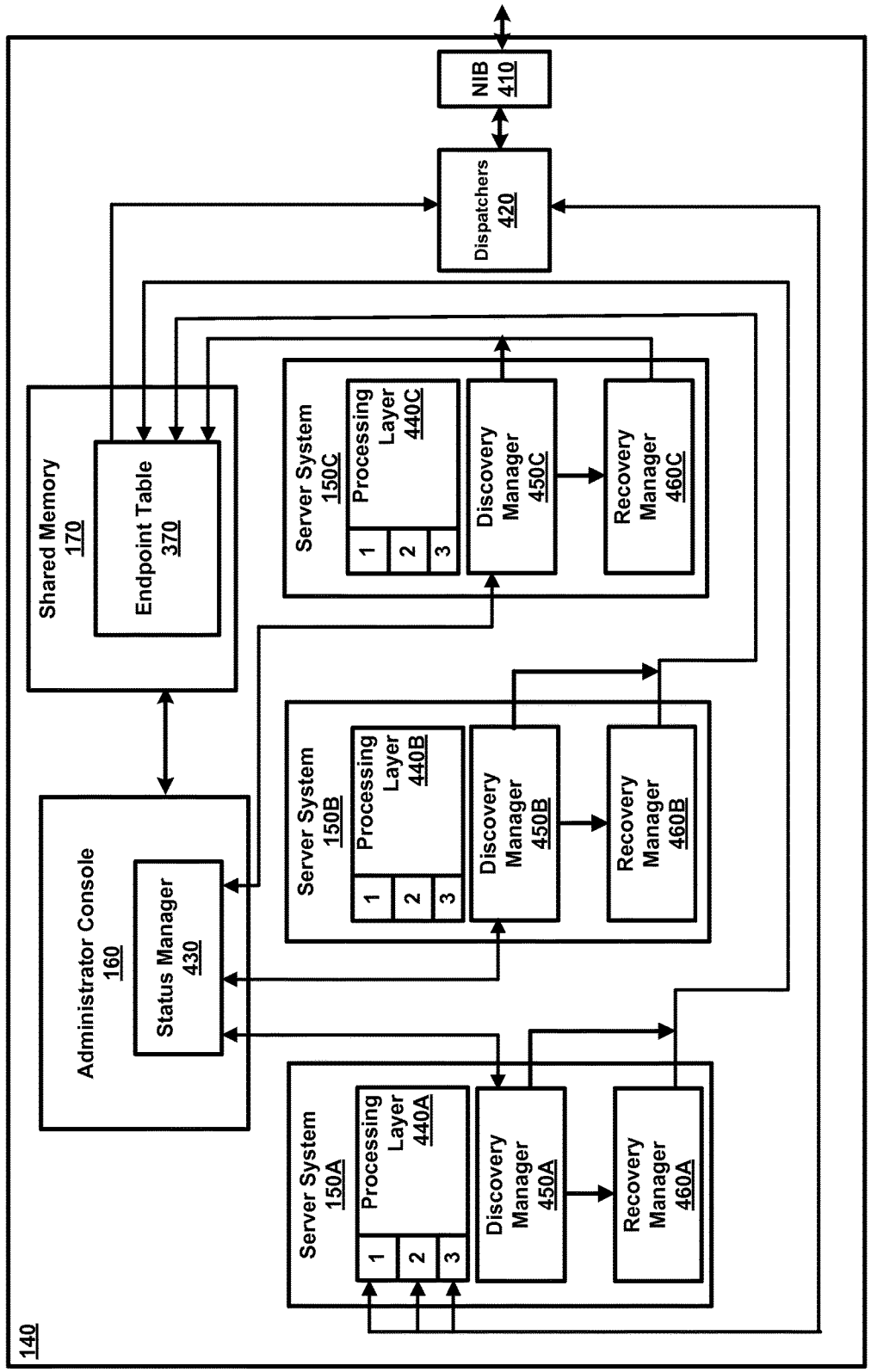
FIG. 4A is a block diagram illustrating the internal architecture of a server site, in an embodiment.

FIG. 4A is a block diagram illustrating the detailed architecture of server site 140 in an embodiment. The block diagram is shown containing network interface block (NIB) 410, dispatchers 420, server systems (servers) 150A-150C, administrator console 160, and shared memory 170. Each of the identified blocks may be implemented as a desired combination of hardware, software and firmware, and is described in detail below.

It may be appreciated that the structure and method of operation of a general server site is well known. Thus, only those portions of server site 140 that are necessary for a full understanding of the present disclosure are described and illustrated herein. For example, data store 180, shown as part of server site 140 in FIG. 1, is not described with respect to FIG. 4A.

Further, merely for illustration, although point-to-point connectivity is shown between the server systems 150A-150C and the administrator console 160, the particular type of connectivity between the servers and the administrator console is not critical to the practice of the present disclosure and any number of configurations of connectivity may be used without departing from the scope of the present disclosure. For example the connectivity between all the server systems 150A-150C and the administrator console 160 may be implemented via a common bus system (as represented in FIG. 1), supported via LAN or other equivalent high-speed networks.

NIB 410 represents one or more communication interfaces (e.g., an Ethernet card) that enables communication between various blocks of server site 140 and external systems/devices, through Internet 190. NIB 410 examines the packets directed to server site 140 for forwarding to appropriate internal block. However, for the present purpose, it may be assumed that the packets are forwarded to dispatchers block 420 for further processing. Upon receipt of packets directed to user systems, NIB410 sends such packets through Internet 190.

Dispatchers 420 provide an interface using which users operating user systems may interact with server site 140. For example, when a packet (i.e., a request) is received at server site 140 directed to a service endpoint, the request is processed by NIB 410 and forwarded to dispatchers 420.

As noted above, server systems 150A-150C have execution entities (i.e., applications) to process requests received on the service endpoints allocated to the respective servers. Dispatchers 420 examines endpoint table 370 to determine the specific active server (among servers 150A-150C) to which the target service endpoint is allocated (e.g., by examining the corresponding active server 312 field shown in FIGS. 3A-3B). Upon determining the specific server on which the desired endpoint is allocated, dispatchers 420 forwards the packet to that server so that a corresponding application on the server may further process the packet.

Upon receiving a response from the respective application, dispatchers 420 forward the response packet to NIB 410 for sending to the external system (e.g., one of user systems 110A-110M, 120A-120N) that is the intended recipient of the response packet. Although dispatchers 420 is shown as being implemented outside the server systems 150A-150C to represent the logic of the message flow, each instance of dispatchers 420 may be implemented in corresponding one of the server systems 150A-150C, as would be understood by those skilled in the relevant arts.

Status manager 430 is defined as part of administrator console 160. Status manager 430 routinely polls each of the servers 150A-150C to determine the servers' operational status, and consequently to identify whether the servers are operational or non-operational. Further server systems 150A-150C poll the status manager 430 periodically to receive the operational or non-operational status of the remaining servers.

Each of server systems 150A-150C is shown containing a respective combination of processing layer (440A-440C), discovery manager (450A-450C) and recovery manager (460A-460C). The description of the server systems is continued in the context of server system 150A. However, all other server systems (150B-150C) in server site 140 have similar structure and method of operation as server system 150A, as would be readily understood by those skilled in the art.

Processing layer 440A executes (or hosts) execution entities (i.e., applications marked as applications 1, 2, 3) that process respective type of user requests received from user systems 110A-110M and 120A-120N directed to corresponding specific endpoints that are allocated to server 150A. Processing layer 440A provides a common development/run-time environment and other software infra-structure elements for executing such applications.

In operation, processing layer 440A processes the packets directed to specific endpoints received from dispatchers 420, and generates response packets. Thereafter, processing layer 440A passes the response packets to dispatchers 420 for sending to the external system (e.g., one of user systems 110A-110M, 120A-120N) that is the intended recipient of the packet. In generating the responses, processing layer 440A may rely on mediators 139 for generating parts or whole of the responses.

Discovery manager 450A updates the endpoint table with current timestamp as the last updated time for endpoints associated with server 150A, which is the basis for determining when to reallocate the endpoints if server 150A were to become non-operational, as briefly described above with respect to FIGS. 3A and 3B.

In addition, discovery manager 450A periodically polls status manager 430 and receives notifications of the (non) operational status of the remaining server systems. The polling interval (i.e., the period of time between two successive polls) is less than the shortest switchover duration of the endpoints allocated to server 150A, since server 150A is deemed to be unavailable (and hence non-operational) if the time of polling (as indicated by the timestamp in last updated time 315) is outside the duration defined by switchover duration 314. Upon receiving notification of non-operational servers, discovery manager 450A accesses the endpoint table 370 and locks the table for identifying which of the endpoints previously allocated to the determined non-operational server are to be reallocated to server system 150A and to server system 150C.

To illustrate the operation of discovery manager 450A with the examples of FIGS. 3A-3C, discovery manager 450A examines endpoints EP3-EP7 in the endpoint table 370. For example, as shown in FIG. 3A, the last updated time 315 for endpoints EP3-EP4 is shown as 19:06:03, with each of the endpoints EP3-EP4 having switchover durations of 2 and 3 minutes respectively. Endpoint EP3 becomes available for reallocation after time instance 19:08:03, i.e., 19:06:03 in last updated time column 315 plus two minutes in switchover duration 314. Endpoint EP4 becomes available for reallocation after time instance 19:09:03, i.e., 19:06:03 in last updated time column 315 plus three minutes in switchover duration 314. It is assumed that discovery manager 450A examines the endpoint table at a time instance after 19:10:10 (which is the latest time instance at which the endpoints EP3-EP7 become available for reallocation).

Thereafter, discovery manager 450A updates the endpoint table 370 to mark all the endpoints EP3-EP7 as inactive. Further, discovery manager 450A updates the active server 312 for each of the endpoints EP3 and EP4 to server 150A, and the active server 312 for each of the endpoints EP5-EP7 to server system 150C. This completes the discovery manager's identification of endpoints to be reallocated. Discovery manager 450A then releases the lock on the endpoint table 370 and prompts the corresponding recovery manager 460A (e.g., via an event) to update the state column 313 for each of the endpoints EP3 and EP4 as "active" and to complete reallocation of the identified endpoints to server 150A.

In an embodiment, discovery manager 450A may contain logic to complete the reallocation (i.e., by updating state column 313 for each of the endpoints EP3 and EP4 as "active") for the endpoints being reallocated to the new responsible server system 150A. However, for endpoints EP5-EP7 being reallocated to the other operational server system 150C, the reallocation may still need to be completed by the corresponding recovery manager 460C. Therefore, to maintain consistency in the operations of the discovery managers and recovery managers of the various operational servers across the server site 140, discovery managers may be configured to perform the function of identifying the various endpoints for reallocation, when part of a new responsible server, and the recovery managers may be configured to perform the function of completing the reallocation of the respective endpoints (as described above).

As noted above, while accessing the endpoint table 370, discovery manager 450A may place a lock (e.g., a write-lock) on the endpoint table 370. The purpose of such lock is to prevent other servers (i.e., other discovery managers, such as 450B and 450C) from operating on (i.e., editing) the endpoint table simultaneously while the discovery manager 450A is accessing and/or editing the table.

Recovery manager 460A receives the identity of the endpoints EP3 and EP4 (for reallocation) from discovery manager 450A, and completes the reallocation of the identified endpoints (EP3 and EP4) to server 150A. Continuing with the example scenario of FIGS. 3A-3C noted above, recovery manager 460A accesses the endpoint table 370 and updates the state column 313 for each of the endpoints EP3 and EP4 to "active". Once the data in column 313 is updated, the reallocation of the endpoints EP3 and EP4 to server 150A is deemed to be complete. Similarly, recovery manager 460C accesses the endpoint table 370 and updates the state column 313 for each of the endpoints EP5-EP7 to "active", thereby completing the reallocation of the endpoints EP5-EP7 to server system 150C.

While accessing the endpoint table 370, recovery manager 460A may place a lock (e.g., a write-lock) on the endpoint table 370 to prevent other servers (i.e., other recovery managers, such as 460B and 460C) from operating on (i.e., editing) the endpoint table simultaneously while the recovery manager 460A is accessing and/or editing the table.

Thus, in accordance with the description above, the reallocation of service endpoints is performed in a distributed manner, by which each discovery manager (450A-450C) identifies the endpoints (if any) to be reallocated to the associated server system. Such a technique may be used in situations when administrator console 160 (and thus status manager 430) is unable to access or make changes to endpoint table 370. However, alternative embodiments may be employed in which the reallocation can be more centrally controlled (e.g., by status manager 430), as will be apparent to a skilled practitioner by reading the disclosure herein.

Thus, in the event of a server system becoming non-operational, the non-operational status of the server is obtained by (discovery managers of) one or more of the other operational servers. The operational servers reallocate the endpoints of the non-operational server such that each of the endpoints of the non-operational server are reallocated to an operational server. The corresponding entries of the reallocated endpoints in the endpoint table are updated accordingly.

The flow of messages between the user system and server site for a particular service s summarized with respect to FIG. 4B below.

7. Message Flow

Figure 4B:
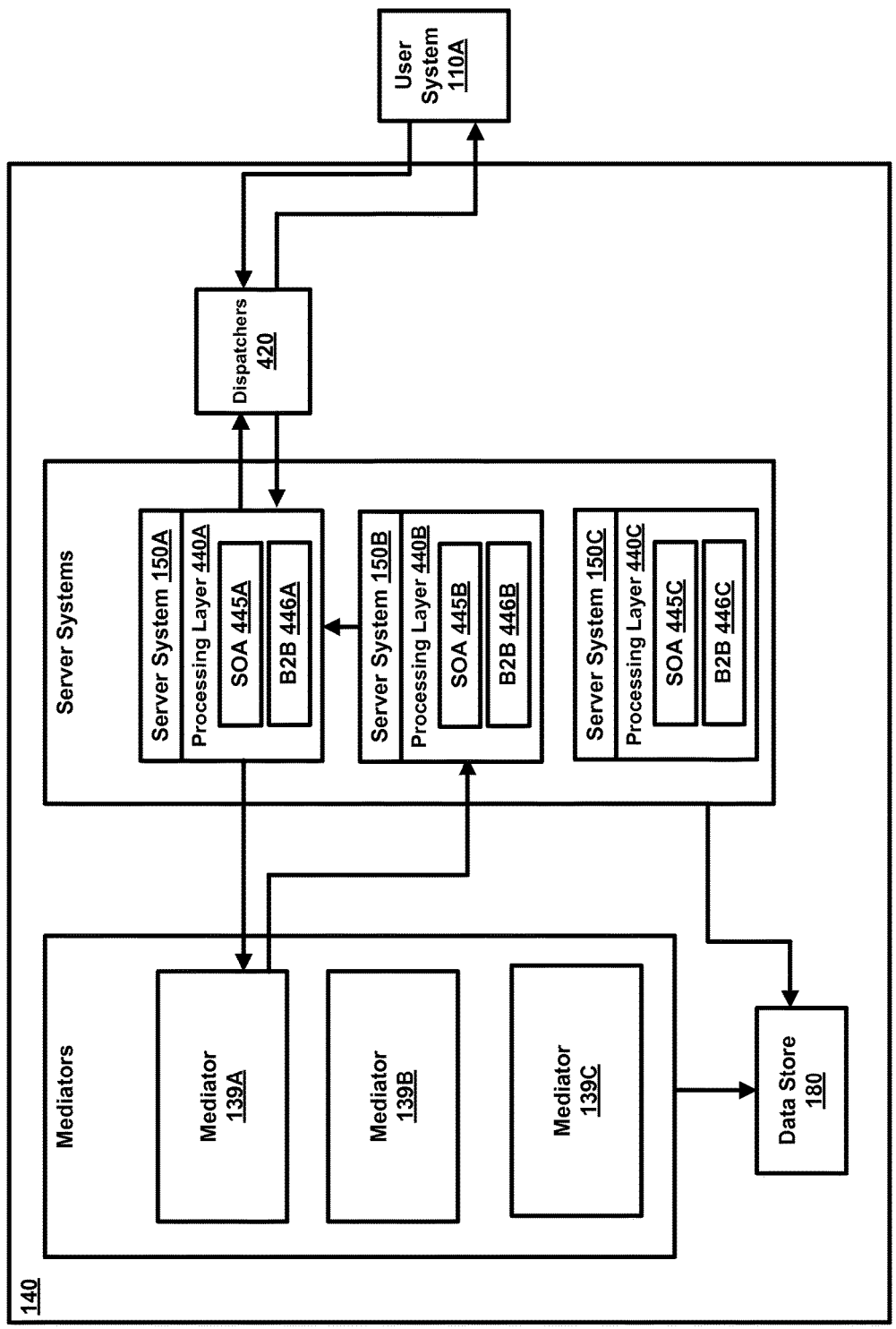
FIG. 4B is a block diagram illustrating the data flow between some of the components of server site, in an embodiment.

FIG. 4B is a block diagram illustrating the detailed architecture of some of the components of server site 140 and the flow of messages, in an embodiment. The block diagram is shown containing user system 110A (external to server site 140), dispatchers 420, server systems (servers) 150A-150C, mediators 139A-139C, and data store 180.

Mediators 139 of FIG. 1 is shown implemented as multiple mediator instances 139A-139C in FIG. 4B. Further, although user system 110A is shown requesting and receiving information from server site 140 without intermediate systems, there could be intermediate systems in between the user system 110A and server site 140 that may function to adapt the request and response messages to suit the particular environment in which the system components of FIG. 4B are implemented, as would be understood by those skilled in the relevant arts.

It is assumed that user system 110A requests a service (as a message) from an endpoint that is defined on server system 150A. The message may represent the placing of a laboratory order or drug order, in the case of healthcare environments. The message that is sent from the user system 110A (to request the service) may be implemented according to HL7 (Health Level 7) standards, which are a set of international standards for transfer of clinical and administrative data between software applications used by various healthcare providers, well known in the relevant arts. An HL7 message consists of a group of optional, required, and/or repeatable segments or fields in a defined sequence, such as the MSH-9 field, which specifies what type of message is being transmitted and what trigger event triggered the message. For example, MSH-9 field in the requested message (from user system 110A) may contain the value RDE-025, where RDE is the HL7 message type, and 025 is the trigger event that triggered the message. In the HL7 standards, an RDE-025 message refers to a "pharmacy/treatment refill authorization request" message.

The message is sent by user system 110A, and received by server site 140 (after having passed through an intermediate system, if necessary). Dispatcher 420 maps the identity of the endpoint in the received message to the identity of the active server (in column 312 in FIGS. 3A-3C) based on a match of the endpoint identifier in the received packet with that in column 310. Specifically, the message is forwarded to the mapped server system, and a specific application defined to process requests to the endpoint, receives and processes the message/packet. Further, dispatcher 420 logs connection information pertaining to the service request (e.g., requesting user system, service endpoint, active server to which the endpoint is allocated to etc.) in a message log (not shown) in data store 180.

Server system 150A is shown with processing layer 440A, which in turn is shown with SOA 445A and B2B 446A. Similarly, other server systems 150B-150C are shown with respective processing layers, SOA, and B2B.

SOA 445A represents a service oriented architecture module that allows the application processing the request message to interact with applications running on other server systems 150B-150C, as well as with mediators 139A-139C. In an embodiment, SOA 445A is part of the Oracle SOA Suite for Healthcare Integration (described above with reference to FIG. 1).

B2B 446A represents a software block that provides the services requested by other server systems (e.g., by the SOA blocks in such server systems). In an embodiment, B2B 446A is implemented using Oracle B2B, provided by Oracle International Corporation, the intended assignee of the subject patent application.

In general, processing layer 440A processes a received message (including performing any write/read operations to/from data store 180 or other external systems) and places a response message as a new entry in the message log (paired with the corresponding request message). Thereafter, dispatchers 420, which polls the message log on a periodic basis, identifies the response message and passes the response to the requesting user system. However, if generation of a response requires services of other server systems (including those outside of server site 140), processing layer 440A forwards an appropriate request to mediator 139A.

Mediator 139A interacts with one or more back-end systems to obtain information necessary to form a response to the service request. Alternately or in addition, mediator 139A may send a request to another server system 150B-150C, if generation of a response requires applications on those server systems to perform necessary operations. Specifically, the B2B layers of the server systems 150B-150C generate the necessary information for the response and pass the information back to the SOA 445A layer of server system 150A. Thereafter, server system 150A forms the complete response and writes the response message to the message log as described, which is then picked up by dispatchers 420 for further delivery.

As shown in FIG. 4B, it is assumed that at least one operation necessary to form the response is performed in an application of server system 150B. Therefore, FIG. 4B shows mediator 139A sending an appropriate request to server system 150B, which in turn is shown sending the response (with the additional information) to server system 150A.

If server system 150A becomes non-operational after sending a request to mediator 139A and prior to receiving the response from server system 150B, any response received from server system 150B cannot be processed by server system 150A (as it is non-operational). In such a case, the new responsible server (e.g., 150C) which self-allocates the endpoints of the server system 150A examines the message log to derive connection information for all incoming request messages that do not have a corresponding response messages, and processes such incoming request messages again.

If the server system 150A becomes non-operational after storing the response message in the message log, dispatcher 420 picks up the forwards the message to the requesting user system 110A, so there is no additional action required from the new responsible server.

It should be further appreciated that the features described above can be implemented in various embodiments as a desired combination of one or more of hardware, executable modules, and firmware. The description is continued with respect to an embodiment in which various features are operative when the instructions in the executable modules are executed.

8. Digital Processing System

Figure 5:
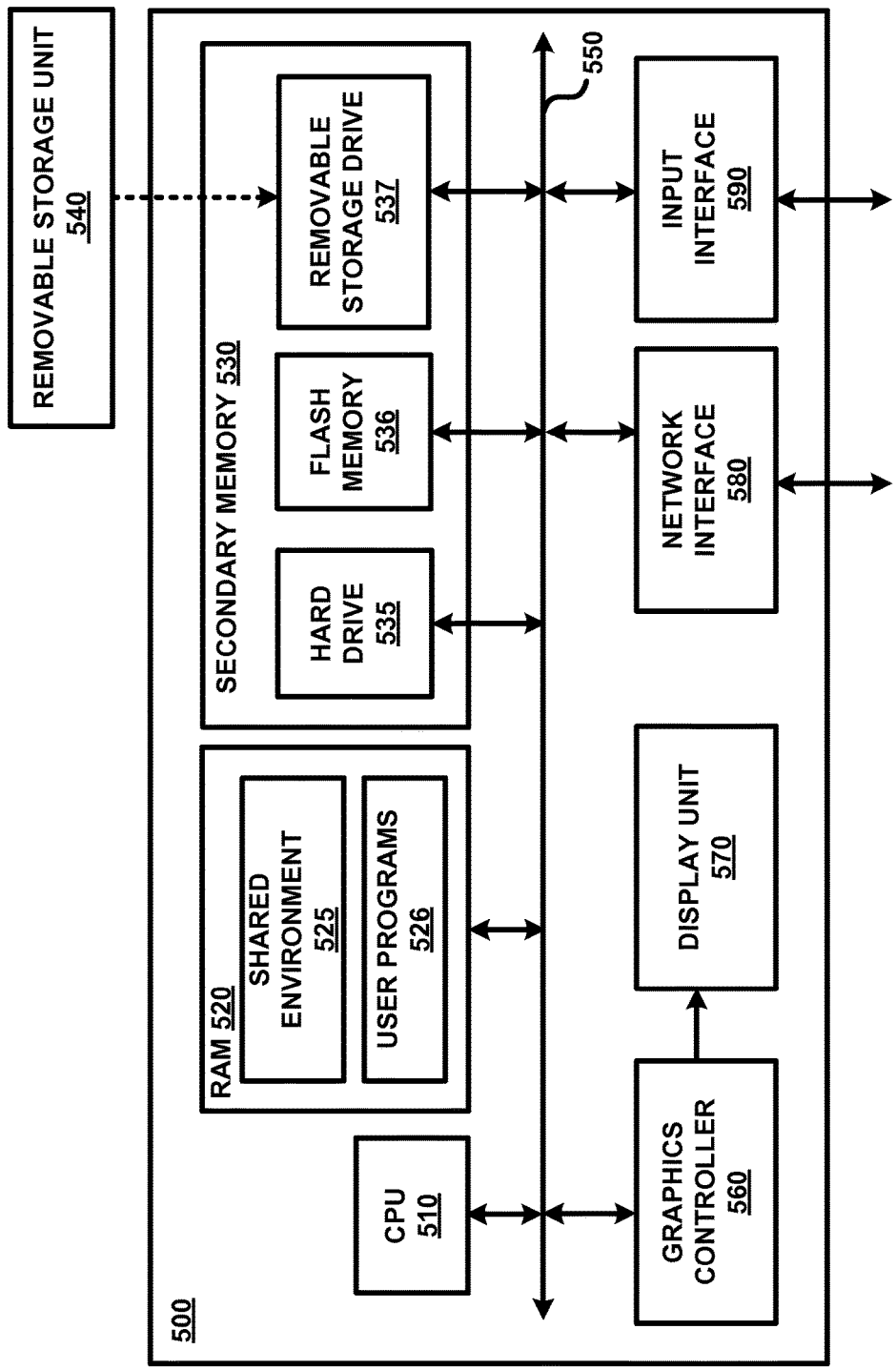
FIG. 5 is a block diagram illustrating the details of a digital processing system in which several aspects of the present disclosure are operative by execution of appropriate software instructions.

FIG. 5 is a block diagram illustrating the details of digital processing system 500 in which several aspects of the present disclosure are operative by execution of appropriate software instructions. Digital processing system 500 corresponds to one or more of the server systems in server site 140 from which various features described above can be provided.

Digital processing system 500 may contain one or more processors (such as a central processing unit (CPU) 510), random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present disclosure. CPU 510 may contain multiple processing units, with each processing unit potentially being designed for a specific task. Alternatively, CPU 510 may contain only a single general-purpose processing unit. RAM 520 may receive instructions from secondary memory 530 using communication path 550.

RAM 520 is shown currently containing software instructions constituting shared environment 525 and/or user programs 526. Shared environment 525 contains utilities shared by user programs, and such shared utilities include operating system, device drivers, etc., which provide a (common) run time environment for execution of user programs 526.

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse) that may be used to provide various inputs (such as to specify the allocated endpoints). Network interface 580 provides connectivity to a network (e.g., using Internet Protocol), and may be used to communicate with other connected systems (such as user systems 110A-110M, and 120A-120N).

Secondary memory 530 may contain hard drive 535, flash memory 536, and removable storage drive 537. Secondary memory 530 represents a non-transitory medium, which may store the data (for example, endpoint table 370) and software instructions (for example, for performing the steps of FIG. 2), to enable digital processing system 500 to provide several features in accordance with the present disclosure. The code/instructions stored in secondary memory 530 may either be copied to RAM 520 prior to execution by CPU 510 for higher execution speeds, or may be directly executed by CPU 510.

Secondary memory 530 may contain hard drive 535, flash memory 536, and removable storage drive 537. Some or all of the data and instructions may be provided on removable storage unit 540, and the data and instructions may be read and provided by removable storage drive 537 to CPU 510. Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 530. Volatile media includes dynamic memory, such as RAM 520. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 550. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of allocating service endpoints to servers, said method comprising:

maintaining an endpoint table, which specifies allocation of a plurality of service endpoints to a plurality of server systems, wherein each service endpoint of said plurality of service endpoints is identified by a corresponding unique identifier of a plurality of identifiers, wherein said endpoint table comprises a plurality of entries at a specific time instance, wherein each entry of said plurality of entries associates each unique identifier with a corresponding server system of said plurality of server systems to indicate that requests directed to the service endpoint identified by the unique identifier are to be processed by the corresponding server system;

identifying, at a first time instance following said specific time instance, a condition requiring reallocation of a first set of service endpoints currently allocated to a first server system among a plurality of operational server systems, wherein said first server system and said plurality of operational server systems are contained in said plurality of server systems;

reallocating, after said first time instance, said first set of service endpoints to said plurality of operational server systems;

updating, at a second time instance, said endpoint table in accordance with said reallocation, wherein said second time instance is after said first time instance, wherein upon said updating, each entry of a first set of entries corresponding to said first set of service endpoints associates the corresponding unique identifier with one of said plurality of operational server systems to indicate that requests directed to the service endpoint identified by the unique identifier are to be processed by the corresponding operational server system;

receiving from user systems, a first packet before said first time instance and a second packet after said second time instance, with both of said first packet and said second packets containing said unique identifier, wherein said unique identifier indicates that each of said first packet and said second packet is directed for delivery to a first service endpoint contained within said first set of service endpoints;

examining said end point table to determine before said first time instance that said first service end point is allocated to said first server system, and to determine after said second time instance that said first service end point is allocated to a first operational server system; and delivering, in response to examining, said first packet to said first server system, and said second packet to said first operational server system, wherein said first operational server system is one of said plurality of operational server systems, which is indicated as being allocated to said first service endpoint in said updated endpoint table.

2. The method of claim 1, wherein said operational server systems comprise said first operational server system and a second operational server system, wherein said reallocating comprises identifying said first service endpoint from said first set of service endpoints as suitable for allocation to said first operational server system, and a second service endpoint from said first set of service endpoints as suitable for allocation to said second operational server system, and wherein said updating comprises modifying a first entry in said endpoint table to associate said first service endpoint to said first operational server system, and a second entry in said endpoint table to associate said second service endpoint to said second operational server system.

3. The method of claim 2, wherein said unique identifier comprises an IP address of the server system to which the associated service endpoint is allocated, the transport protocol and a port number at the server system to which packets are to be directed, wherein a first entry of said first set of entries, before said first time instance, contains a first set fields to associate said first service endpoint to said first server system, wherein said modifying modifies a second set of fields of said first entry in said endpoint table to associate said first service endpoint to said first operational server system and to indicate that said first operational server system is currently the active server for processing requests directed to said first service endpoint after said first time instance, wherein said first set of fields and said second set of fields together continue to indicate that said first service endpoint was on said first server system prior to said first time instance, wherein said method further comprises:

polling said plurality of server systems to determine a corresponding operational status of each of said plurality of server systems, wherein said condition comprises a non-operational status of said first server system and said identifying is a consequence of said polling.

4. The method of claim 3, wherein said polling is performed by a status manager external to said plurality of server systems, said method further comprises:
: checking with said status manager, by each of said plurality of operational server systems, whether any server system is determined to be non-operational, wherein said status manager indicates that said first server system is non-operational; and
: wherein said updating comprises, performance by each of said plurality of operational server systems, in response to indication of said first server system being non-operational:
: : self-allocating, in a distributed manner, some of the service endpoints among said first set of service endpoints such that requests thereafter to self-allocated service endpoints are received and processed by said corresponding operational server system.

5. The method of claim 4, wherein said self-allocating further comprises:
: locking of said endpoint table by said first operational server system in a first duration, to reallocate said first service endpoint from said non-operational first server system to said first operational server system, wherein during said first duration, said endpoint table being unavailable for updating to said second operational server system; and
: locking of said endpoint table by said second operational server system in a second duration, to reallocate said second service endpoint from said non-operational first server system to said second operational server system, wherein during said second duration, said endpoint table being unavailable for updating to said first operational server system,
: whereby said reallocation is performed in a distributed manner by said plurality of operational server systems.

6. The method of claim 5, further comprising:
: storing, by each of said plurality of server systems, a current timestamp in a corresponding entry of said endpoint table to indicate that the server system is available to process requests received at associated endpoints;
: maintaining a switchover duration for each of said plurality of endpoints; and
: wherein said identifying at said first time instance, further comprises:
: : examining said first entry in said endpoint table for said switchover duration and said current timestamp last stored associated with the associated service endpoint, wherein said associated service end point is included in said first set of service endpoints if current time is greater than said current timestamp stored in said endpoint table associated with said first service endpoint plus said switchover duration associated with said first service endpoint.

7. The method of claim 6, wherein said plurality of server systems are each configured to provide a plurality of services in a healthcare system, and
: wherein each of said plurality of service endpoints represent a termination point using which user systems can avail of a corresponding service of said plurality of services.

8. The method of claim 1, wherein each of said plurality of service endpoints represent a termination point using which user systems can avail of a corresponding service of said plurality of services,
: wherein each of said plurality of server systems executes a respective set of execution entities, wherein each execution entity is implemented to provide a corresponding set of services of said plurality of services, wherein said first server system executes a first set of execution entities before and after said first time instance,
: wherein a first operational server system of said plurality of operational server systems executes a second set of execution entities before and after said first time instance,
: wherein a first service endpoint of said first set of service endpoints is allocated to one of said first set of execution entities before said first time instance and said first service endpoint is reallocated to one of said second set of execution entities after said first time instance.

9. A non-transitory machine readable medium storing one or more sequences of instructions, wherein execution of said one or more sequences of instructions by one or more processors contained in a server site causes said server site to perform the actions of:
: maintaining an endpoint table, which specifies allocation of a plurality of service endpoints to a plurality of server systems,
: wherein each service endpoint of said plurality of service endpoints is identified by a corresponding unique identifier of a plurality of identifiers,
: wherein said endpoint table comprises a plurality of entries at a specific time instance, wherein each entry of said plurality of entries associates each unique identifier with a corresponding server system of said plurality of server systems to indicate that requests directed to the service endpoint identified by the unique identifier are to be processed by the corresponding server system;
: identifying, at a first time instance following said specific time instance, a condition requiring reallocation of a first set of service endpoints currently allocated to a first server system among a plurality of operational server systems, wherein said first server system and said plurality of operational server systems are contained in said plurality of server systems;
: reallocating, after said first time instance, said first set of service endpoints to said plurality of operational server systems;
: updating, at a second time instance, said endpoint table in accordance with said reallocation, wherein said second time instance is after said first time instance,
: wherein upon said updating, each entry of a first set of entries corresponding to said first set of service endpoints associates the corresponding unique identifier with one of said plurality of operational server systems to indicate that requests directed to the service endpoint identified by the unique identifier are to be processed by the corresponding operational server system;
: receiving from user systems, a first packet before said first time instance and a second packet after said second time instance, with both of said first packet and said second packets containing said unique identifier,
: wherein said unique identifier indicates that each of said first packet and said second packet is directed for delivery to a first service endpoint contained within said first set of service endpoints;
: examining said end point table to determine before said first time instance that said first service end point is allocated to said first server system, and to determine after said second time instance that said first service end point is allocated to a first operational server system; and delivering, in response to examining, said first packet to said first server system, and said second packet to said first operational server system, wherein said first operational server system is one of said plurality of operational server systems, which is indicated as being allocated to said first service endpoint in said updated endpoint table.

10. The non-transitory machine readable medium of claim 9, wherein said operational server systems comprise said first operational server system and a second operational server system, wherein said reallocating comprises identifying said first service endpoint from said first set of service endpoints as suitable for allocation to said first operational server system, and a second service endpoint from said first set of service endpoints as suitable for allocation to said second operational server system, and wherein said updating comprises modifying a first entry in said endpoint table to associate said first service endpoint to said first operational server system, and a second entry in said endpoint table to associate said second service endpoint to said second operational server system.

11. The non-transitory machine readable medium of claim 10, wherein said unique identifier comprises an IP address of the server system to which the associated service endpoint is allocated, the transport protocol and a port number at the server system to which packets are to be directed, wherein a first entry of said first set of entries, before said first time instance, contains a first set fields to associate said first service endpoint to said first server system, wherein said modifying modifies a second set of fields of said first entry in said endpoint table to associate said first service endpoint to said first operational server system and to indicate that said first operational server system is currently the active server for processing requests directed to said first service endpoint after said first time instance, wherein said first set of fields and said second set of fields together continue to indicate that said first service endpoint was on said first server system prior to said first time instance, wherein said actions further comprises:

polling said plurality of server systems to determine a corresponding operational status of each of said plurality of server systems, wherein said condition comprises a non-operational status of said first server system and said identifying is a consequence of said polling.

12. The non-transitory machine readable medium of claim 11, wherein said polling is performed by a status manager external to said plurality of server systems, said actions further comprising:

checking with said status manager, by each of said plurality of operational server systems, whether any server system is determined to be non-operational, wherein said status manager indicates that said first server system is non-operational; and wherein said updating comprising, performance by each of said plurality of operational server systems, in response to indication of said first server system being non-operational:

self-allocating, in a distributed manner, some of the service endpoints among said first set of service endpoints such that requests thereafter to self-allocated service endpoints are received and processed by said corresponding operational server system.

13. The non-transitory machine readable medium of claim 12, wherein said self-allocating further comprising:

locking of said endpoint table by said first operational server system in a first duration, to reallocate said first service endpoint from said non-operational first server system to said first operational server system, wherein during said first duration, said endpoint table being unavailable for updating to said second operational server system; and locking of said endpoint table by said second operational server system in a second duration, to reallocate said second service endpoint from said non-operational first server system to said second operational server system, wherein during said second duration, said endpoint table being unavailable for updating to said first operational server system, whereby said reallocation is performed in a distributed manner by said plurality of operational server systems.

14. The non-transitory machine readable medium of claim 13, said actions further comprising:

storing, by each of said plurality of server systems, a current timestamp in a corresponding entry of said endpoint table to indicate that the server system is available to process requests received at associated endpoints;

maintaining a switchover duration for each of said plurality of service endpoints; and wherein said identifying at said first time instance, further comprising:

examining said first entry in said endpoint table for said switchover duration and said current timestamp last stored associated with the associated service endpoint, wherein said associated service end point is included in said first set of service endpoints if current time is greater than said current timestamp stored in said endpoint table associated with said first service endpoint plus said switchover duration associated with said first service endpoint.

15. A server site comprising a plurality of server systems operable to perform the actions of:

maintaining an endpoint table, which specifies allocation of a plurality of service endpoints to a plurality of server systems, wherein each service endpoint of said plurality of service endpoints is identified by a corresponding unique identifier of a plurality of identifiers, wherein said endpoint table comprises a plurality of entries at a specific time instance, wherein each entry of said plurality of entries associates each unique identifier with a corresponding server system of said plurality of server systems to indicate that requests directed to the service endpoint identified by the unique identifier are to be processed by the corresponding server system;

identifying, at a first time instance following said specific time instance, a condition requiring reallocation of a first set of service endpoints currently allocated to a first server system among a plurality of operational server systems, wherein said first server system and said plurality of operational server systems are contained in said plurality of server systems;

reallocating, after said first time instance, said first set of service endpoints to said plurality of operational server systems;

updating, at a second time instance, said endpoint table in accordance with said reallocation, wherein said second time instance is after said first time instance, wherein upon said updating, each entry of a first set of entries corresponding to said first set of service endpoints associates the corresponding unique identifier with one of said plurality of operational server systems to indicate that requests directed to the service endpoint identified by the unique identifier are to be processed by the corresponding operational server system;

receiving from user systems, a first packet before said first time instance and a second packet after said second time instance, with both of said first packet and said second packets containing said unique identifier, wherein said unique identifier indicates that each of said first packet and said second packet is directed for delivery to a first service endpoint contained within said first set of service endpoints;

examining said end point table to determine before said first time instance that said first service end point is allocated to said first server system, and to determine after said second time instance that said first service end point is allocated to a first operational server system; and delivering, in response to examining, said first packet to said first server system, and said second packet to said first operational server system, wherein said first operational server system is one of said plurality of operational server systems, which is indicated as being allocated to said first service endpoint in said updated endpoint table.

16. The server site of claim 15, wherein said operational server systems comprise said first operational server system and a second operational server system, wherein said reallocating comprises identifying said first service endpoint from said first set of service endpoints as suitable for allocation to said first operational server system, and a second service endpoint from said first set of service endpoints as suitable for allocation to said second operational server system, and wherein said updating comprises modifying a first entry in said endpoint table to associate said first service endpoint to said first operational server system, and a second entry in said endpoint table to associate said second service endpoint to said second operational server system.

17. The server site of claim 16, wherein said unique identifier comprises an IP address of the server system to which the associated service endpoint is allocated, the transport protocol and a port number at the server system to which packets are to be directed, wherein a first entry of said first set of entries, before said first time instance, contains a first set fields to associate said first service endpoint to said first server system, wherein said modifying modifies a second set of fields of said first entry in said endpoint table to associate said first service endpoint to said first operational server system and to indicate that said first operational server system is currently the active server for processing requests directed to said first service endpoint after said first time instance, wherein said first set of fields and said second set of fields together continue to indicate that said first service endpoint was on said first server system prior to said first time instance, wherein said actions further comprises:
polling said plurality of server systems to determine a corresponding operational status of each of said plurality of server systems,
wherein said condition comprises a non-operational status of said first server system and said identifying is a consequence of said polling.

18. The server site of claim 17, wherein said polling is performed by a status manager external to said plurality of server systems, said actions further comprises:
checking with said status manager, by each of said plurality of operational server systems, whether any server system is determined to be non-operational, wherein said status manager indicates that said first server system is non-operational; and
wherein said updating comprises, performance by each of said plurality of operational server systems, in response to indication of said first server system being non-operational:
self-allocating, in a distributed manner, some of the service endpoints among said first set of service endpoints such that requests thereafter to self-allocated service endpoints are received and processed by said corresponding operational server system.

19. The server site of claim 18, wherein said self-allocating further comprises:
locking of said endpoint table by said first operational server system in a first duration, to reallocate said first service endpoint from said non-operational first server system to said first operational server system, wherein during said first duration, said endpoint table being unavailable for updating to said second operational server system; and
locking of said endpoint table by said second operational server system in a second duration, to reallocate said second service endpoint from said non-operational first server system to said second operational server system, wherein during said second duration, said endpoint table being unavailable for updating to said first operational server system,
whereby said reallocation is performed in a distributed manner by said plurality of operational server systems.

20. The server site of claim 19, wherein said plurality of server systems are operable to further perform the actions of:
storing, by each of said plurality of server systems, a current timestamp in a corresponding entry of said endpoint table to indicate that the server system is available to process requests received at associated endpoints;
maintaining a switchover duration for each of said plurality of service endpoints; and
wherein said identifying at said first time instance, further comprises:
examining said first entry in said endpoint table for said switchover duration and said current timestamp last stored associated with the associated service endpoint, wherein said associated service end point is included in said first set of service endpoints if current time is greater than said current timestamp stored in said endpoint table associated with said first service endpoint plus said switchover duration associated with said first service endpoint.

* * * * *

UNITED STATES PATENT AND TRADEMARK OFFICE
CERTIFICATE OF CORRECTION

PATENT NO. : 10,110,670 B2  
APPLICATION NO. : 14/803139  
DATED : October 23, 2018  
INVENTOR(S) : Veeravarapu et al.

Page 1 of 1

It is certified that error appears in the above-identified patent and that said Letters Patent is hereby corrected as shown below:

On the Title Page

Column 1, under Inventors, Line 1, delete "Banglaore" and insert -- Bangalore --, therefor.

On page 2, Column 1, under Other Publications, Line 20, delete "middlewear/" and insert -- middleware/ --, therefor.

In the Specification

In Column 10, Line 62, delete "NIB410" and insert -- NIB 410 --, therefor.

In Column 11, Line 3, delete "NIB410" and insert -- NIB 410 --, therefor.

In Column 13, Line 45, delete "service s" and insert -- service is --, therefor.

In the Claims

In Column 18, Line 49, in Claim 3, delete "set fields" and insert -- set of fields --, therefor.

In Column 21, Line 31, in Claim 11, delete "set fields" and insert -- set of fields --, therefor.

In Column 23, Line 51, in Claim 17, delete "set fields" and insert -- set of fields --, therefor.

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*